3,014,918
POLYOXYALKYLENE ETHERS OF DODECAHYDROCARBAZOLE

Hans Dressler, Pitcairn, and Melvin E. Baum, Pittsburgh, Pa., assignors to Koppers Company, Inc., a corporation of Delaware
No Drawing. Filed June 16, 1959, Ser. No. 820,615
4 Claims. (Cl. 260—315)

This invention relates to etherified heterocyclic amines. In one specific aspect, it relates to polyoxyalkylene ethers of dodecahydrocarbazole.

Dodecahydrocarbazole, a hydrogenation product of carbazole, is a promising chemical intermediate because of its solvent solubility, relatively low melting point and the basicity of its amino nitrogen. Known derivatives of this interesting compound are relatively few, possibly because of the expense heretofore involved in its preparation. Recent refinements in the hydrogenation of carbazole (which occurs in coal tar to the extent of 2 or 3 percent in the anthracene fraction thereof) have made dodecahydrocarbazole readily available.

Quite surprisingly, we have found a new class of chemical compounds, the polyoxyalkylene ethers of dodecahydrocarbazole, which are remarkably effective as emulsificants and lubricants and which, in addition, possess corrosion-inhibiting properties.

It is, therefore, an object of the present invention to provide a new class of heterocyclic ethers which are astonishingly effective as corrosion-inhibiting emulsificants and lubricants.

In accordance with the invention, we have discovered chemical compounds of the formula:

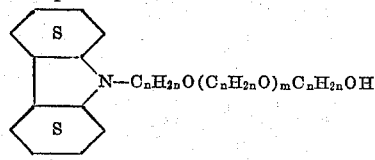

In the formula shown hereabove, $n$ is an integer having a value of 2 or 3 and $m$ is an integer having an average value of 3 to 30 and higher.

The physical nature of the compounds of the invention varies according to the number of oxyalkylene groups. When $m$ in the above formula has an average value between about 3 and 30, the resulting ethers are soluble in a wide variety of solvents, including water. These water-soluble ethers exhibit excellent surface activity; thus they are eminently suitable as emulsificants and dispersants for use in aqueous media. As the value of $m$ is increased above about 20, the product ethers are extremely viscous semi-solid to waxy solids. If the value of $m$ is increased to 30–50 the water solubility is somewhat diminished. All of these high molecular weight products are readily soluble in oil. They are excellent lubricants and dispersants for use in non-aqueous media. Since the obtainable degree of etherification varies from molecule to molecule, the value given for $m$ represents an average value. In other words, for a given quantity of etherified dodecahydrocarbazole, some molecules may contain as few as one oxyalkylene group and others may contain as many as 100 of such groups.

The dodecahydrocarbazole nucleus imparts a moderate basicity to the novel ethers; a property which makes them especially effective as acid scavengers. Thus, when they are used as emulsificants or dispersants for acidic solutions, for example, pickling baths, they serve to retard the corrosive attack of the acid on metal parts. The corrosion-inhibiting property of the compounds of the invention makes them particularly suitable as dispersants for certain oil well drilling fluids which comprise acidic dispersions of petroleum hydrocarbons.

The novel ethers of the invention are made by reacting either ethylene oxide or propylene oxide with dodecahydrocarbazole in the presence of an alkaline catalyst at a temperature of between about room temperature and the decomposition temperature of the reactants and products. Ethylene oxide, which is normally gaseous, can be used as such, or it can be liquified before adding it to the dodecahydrocarbazole.

The reaction is conducted in the presence of a moderate to strongly alkaline catalyst. Suitable catalysts include the alkali and alkaline earth metal hydroxides or oxides, of which sodium and potassium hydroxide are particularly effective.

The reaction temperature, which, as we have noted, can vary between room temperature and the decomposition temperature of the reactants and products, is conveniently between about 25 and 200° C. The reaction works well at atmospheric pressure, although superatmospheric pressures can be used, if desired. The use of a slight positive pressure is sometimes helpful. Suitable solvents could be used for the reaction, although their presence is not required.

Since the reaction is substantially quantitative, the number of moles of alkylene oxide added to the dodecahydrocarbazole is controlled according to the product desired. As we have noted above, if about 3 to 30 moles of alkylene oxide are added to the dodecahydrocarbazole, the resulting product is readily water-soluble. The product increases in viscosity and decreases somewhat in water solubility as the number of alkylene oxide groups is increased. As the number of moles of alkylene oxide is increased above about 20, the product changes from a viscous semi-solid to a waxy solid.

Our invention is further illustrated by the following examples.

Example I

A stainless steel flask was equipped with stirrer, thermometer, gas inlet and outlet, and bubble counters. 89.9 grams (0.5 mole) of dodecahydrocarbazole and 6.5 grams (0.16 mole) of sodium hydroxide were placed therein, the mixture was heated to 90° C. with a constant stirring, and a stream of gaseous ethylene oxide was added thereto. The temperature was raised to 120° C. and held for 6 hours, during which time 151 grams (3.44 moles) of ethylene oxide was added to the mixture. The resulting polyoxyethylene ether of dodecahydrocarbazole was a viscous, water-soluble syrup, having a boiling point greater than about 300° C. at 5 mm. of Hg. It was soluble in benzene and gave a stable emulsion with hydrochloric acid. Nitrogen analysis indicated the presence of about seven —$CH_2CH_2O$— groups per molecule (average value). Calculated for $C_{26}H_{49}O_7N$ N, 2.78. Found: N, 2.71. The infrared spectrum showed the absence of the characteristic NH adsorption peak at 3.15 microns and, thus, the absence of unreacted dodecahydrocarbazole.

The corresponding oxypropylene ether is obtained as described hereabove by using propylene oxide in lieu of ethylene oxide.

Example II

Into a mixture of 98 grams (0.55 mole) of dodecahydrocarbazole and 7.3 grams (0.18 mole) of sodium hydroxide was passed 605 grams (13.8 moles) of ethylene oxide gas at 120–128° C. over a period of 8 hours. After cooling the product was a tan, soft wax weighing 652 grams; thus a total of 547 grams (12.4 moles) of ethylene oxide was absorbed. The ethylene oxide absorption shows that the product contained an average of about 22 oxyethylene groups per molecule. It was readily soluble in water and in toluene. Upon prolonged heating at 100° C. at 0.01 mm. Hg only 1.3 percent of the product volatilized.

We claim:
1. A chemical compound of the formula:

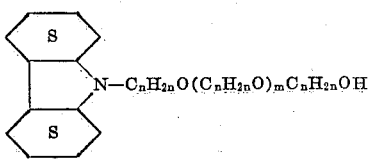

wherein $n$ is an integer having a value of at least 2 and not more than 3 and $m$ is an integer having a value of 3–50.

2. A chemical compound of the formula:

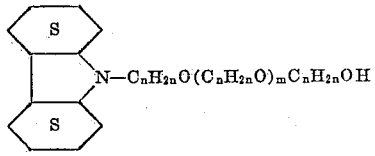

wherein $n$ is an integer having the value of at least 2 and not more than 3 and $m$ is an integer having a value of 3–30.

3. Compound of claim 2 wherein $n$ is 2.
4. Compound of claim 2 wherein $n$ is 3.

References Cited in the file of this patent
UNITED STATES PATENTS

| | | |
|---|---|---|
| 2,662,898 | Ross et al. | Dec. 15, 1953 |
| 2,800,487 | Mark | July 23, 1957 |